United States Patent [19]
Branick

[11] 3,824,862
[45] July 23, 1974

[54] WHEEL BALANCING APPARATUS

[76] Inventor: Charles Earl Branick, 1601 S. 9th St., Fargo, N. Dak. 58102

[22] Filed: Dec. 21, 1972

[21] Appl. No.: 317,402

[52] U.S. Cl. .................................................. 73/480
[51] Int. Cl. ........................................... G01m 1/02
[58] Field of Search ............ 73/480, 484, 485, 486, 73/487

[56] References Cited
UNITED STATES PATENTS

| | | | |
|---|---|---|---|
| 2,194,936 | 3/1940 | Hatch | 73/480 X |
| 2,201,982 | 5/1940 | Bazarek | 73/480 X |
| 2,270,657 | 1/1942 | Kraft | 73/484 |
| 3,036,468 | 5/1962 | Anderson | 73/486 |
| 3,483,757 | 12/1969 | Kushmuk et al. | 73/487 X |

FOREIGN PATENTS OR APPLICATIONS

| 1,308,945 | 10/1962 | France | 73/487 |
|---|---|---|---|

Primary Examiner—James J. Gill
Attorney, Agent, or Firm—Fred Wiviott

[57] ABSTRACT

Wheel balancing apparatus especially useful for static balancing of truck tires of various standard sizes including a carrier mounted for vertical movement upon a stationary base frame and a spindle freely rotatably mounted on the carriage about a horizontal axis for carrying a mounting cone having a plurality of circumferential grooves of diameters corresponding to those of the central openings of standard sized disc type truck wheels. A clamping ring assembly slidably mounted on the spindle is urged by a clamping nut axially of the spindle into engagement with a wheel disc to seat and retain the wheel in position on the appropriate groove in the cone. The carriage is movable vertically by a fluid motor for firstly enabling relatively heavy truck wheels to be mounted upon the spindle while the wheel is resting on the floor and thereafter for elevating the wheel clear of the floor for the balancing operation. An adapter assembly may be provided for balancing rim mounted wheels.

18 Claims, 8 Drawing Figures

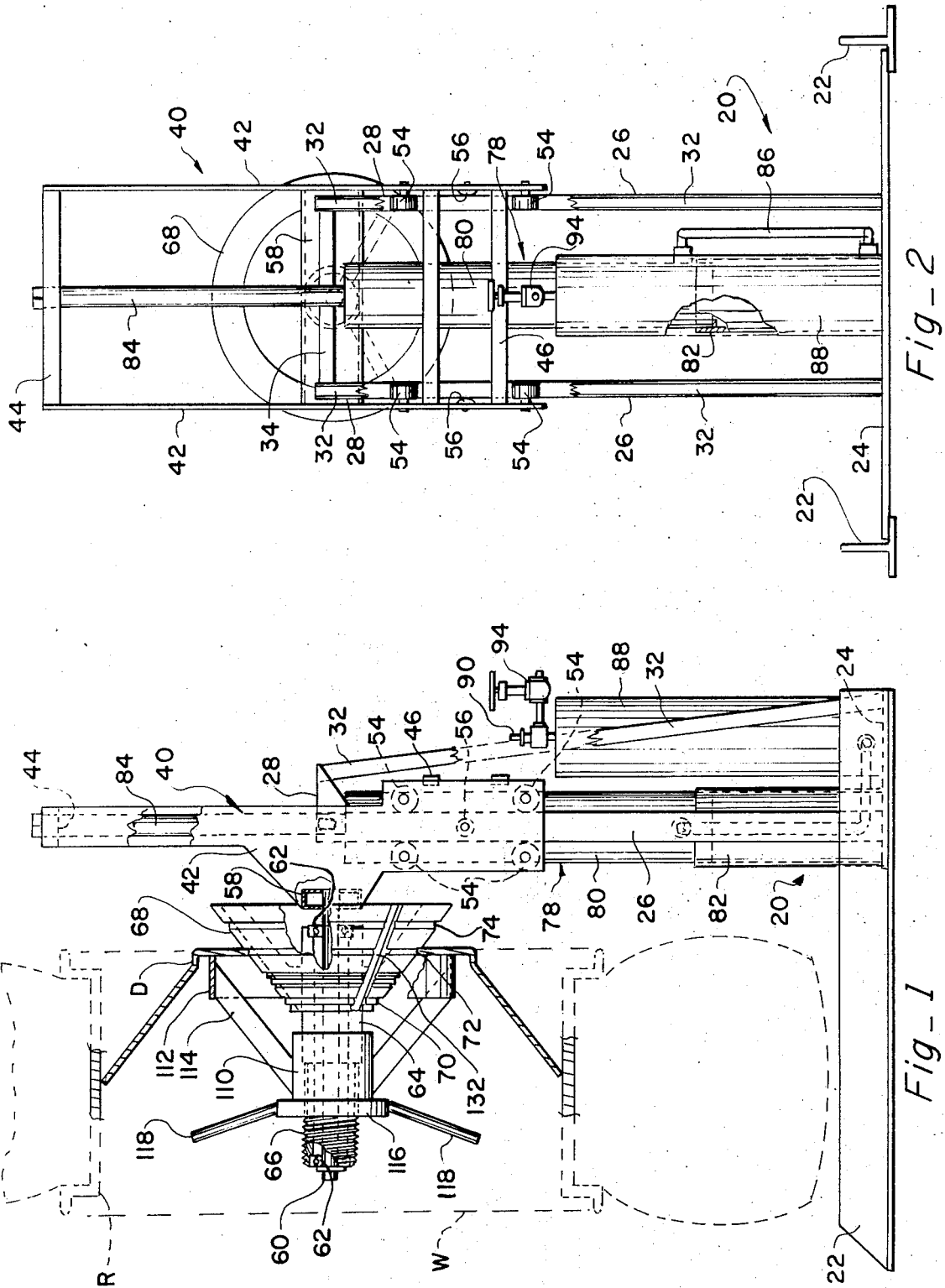

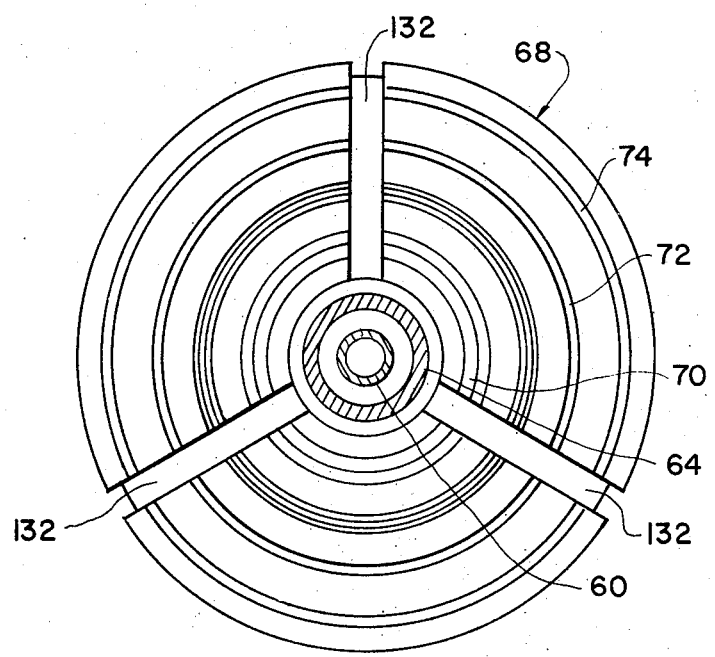
Fig_3
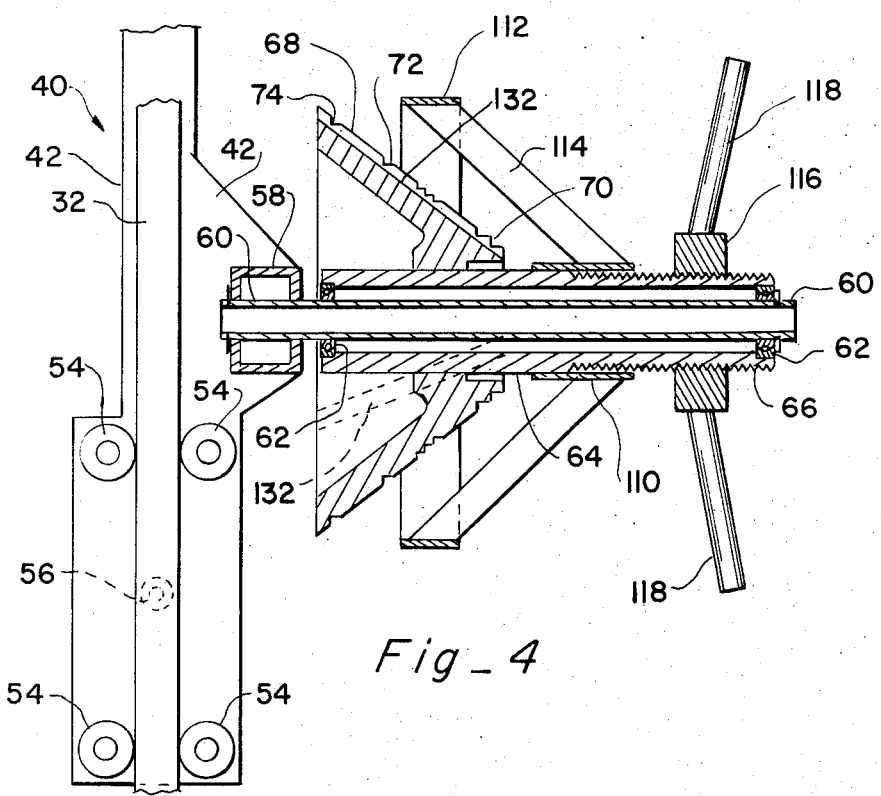
Fig_4

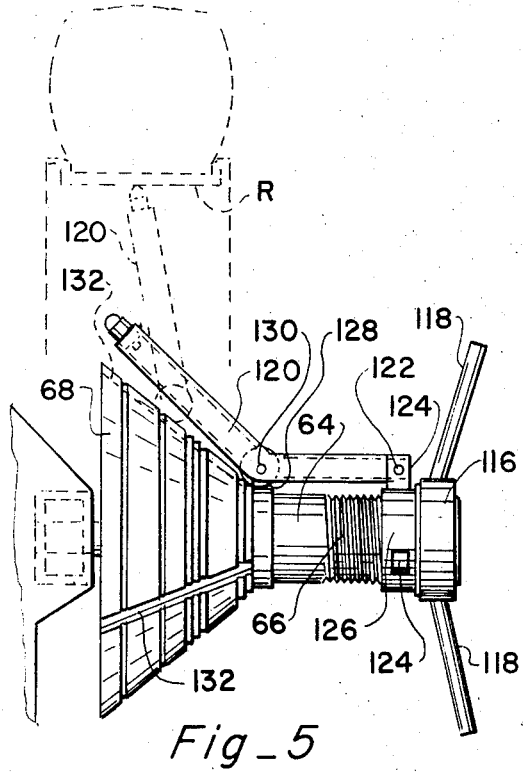
Fig_5
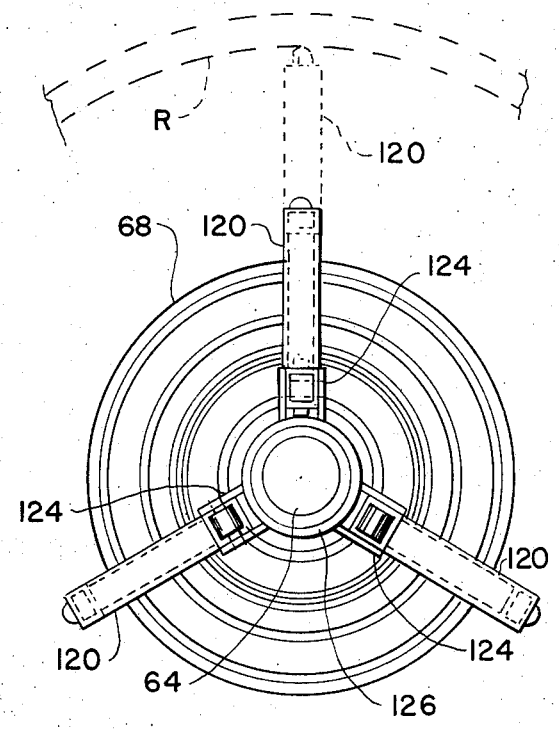
Fig_6
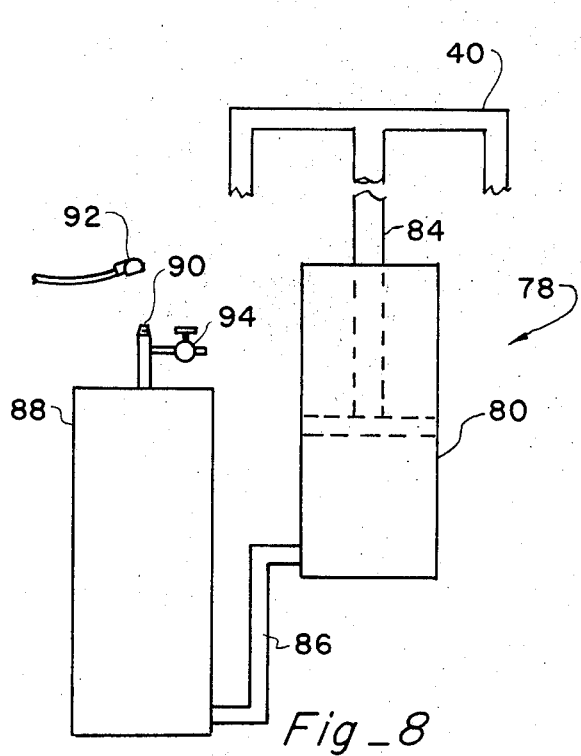
Fig_8
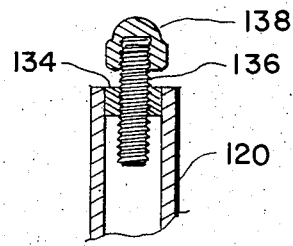
Fig_7

3,824,862

WHEEL BALANCING APPARATUS

BACKGROUND OF THE INVENTION

The present invention relates to apparatus for the static wheel balancing of truck tires.

Because of their substantial initial expense and the heavy usage to which they are put, it is desirable that truck tire-wheel combinations have their balance checked frequently. The present invention is especially directed to a truck wheel balancing apparatus of relatively simple and inexpensive construction which is capable of performing a static balancing operation on truck tires and which is able to handle the heavy wheel and tire combinations with a minimum of manual effort.

SUMMARY OF THE INVENTION

It is an object of the invention to provide a new and improved wheel balancing apparatus particularly adapted for trucks.

Another object of the invention is to provide a wheel balancing arrangement which permits balancing of truck wheels having different wheel disc central diameters.

A further object of the invention is to provide a wheel balancing apparatus which permits balancing truck wheels of both the disc and drum types.

Yet another object of the invention is to provide a truck wheel balancing device which permits the wheels to be mounted on the balancing element while resting on the floor.

These and other objects and advantages of the invention will become apparent from the following description taken with the accompanying drawings.

In general terms, the present invention employs a stationary base frame upon which a spindle carrying carriage is mounted for vertical movement and is vertically positionable by a fluid motor. A support spindle is mounted upon the carriage for rotation about a horizontal axis and carries a generally conical mounting member having circumferential grooves dimensioned in accordance with the central openings in standard sized disc type truck wheels. The wheel to be balanced may be moved into contact with the cone while resting on the floor with the elevation of the cone then being adjusted by a fluid motor to center the spindle and wheel axis with each other. The wheel disc may be secured to the cone with the edge of its central opening seated in the groove or notch in the cone which corresponds to the central opening diameter and the fluid motor actuated for raising the wheel to its balancing position.

In the case where the wheel to be balanced is of the rim or discless type, an adapter assembly is mounted on the spindle and cone.

BRIEF DESCRIPTION OF THE DRAWINGS

FIG. 1 is a side elevation view, partially in section of apparatus embodying the present invention;

FIG. 2 is a rear view of the apparatus of FIG. 1;

FIG. 3 is a front view of the wheel mounting cone;

FIG. 4 is a central cross sectional view of the spindle and cone assembly for mounting disc type wheels;

FIG. 5 is a side elevation view, with certain parts broken away or omitted of the spindle and cone with an adapter for mounting discless or rim type wheels;

FIG. 6 is a front view of the assembly of FIG. 5;

FIG. 7 is a detail cross section taken on line 7—7 of FIG. 5; and

FIG. 8 is a schematic diagram of the fluid pressure lifting system.

DESCRIPTION OF THE PREFERRED EMBODIMENT

The truck tire balancer disclosed in the drawings includes a stationary base frame assembly designated generally 20. Base assembly 20 includes a pair of spaced, generally parallel foot members 22 which may be constructed of a relatively heavy T-shaped cross section stock. Foot members 22 may be interconnected by a relatively flat floor plate member 24 secured in any suitable manner, such as by welding, at its opposite ends to foot members 22. A pair of substantially vertical posts 26 are secured at their lower ends to floor plate 24 and a generally rearwardly projecting bracket 28 is fixedly secured at the upper end of each post 26. In addition, each post 26 is braced in a substantially vertical position by an inclined brace member 32 fixedly secured at its lower end to floor plate 24 and at its upper end to the rearward corner of bracket 28. A generally horizontally extending strap 34 is secured to and extends between brace members 32 near their upper end to further rigidify the assembly.

Base frame assembly 20 carries a vertically movable carriage designated generally 40 and which is mounted on posts 26 for substantially vertical movement relative to base frame 20. Carriage 40 includes a pair of like side plate members 42 which are fixedly secured in spaced apart parallel relationship to each other by a top bar 44 extending between their upper ends and one or more horizontally extending frame members such as 46 secured to and extending between side plates 42 near their lower ends. The lower end portion of side plates 42 may be enlarged as at 52 for supporting on its inner surface upper and lower pairs of guide rollers 54. The rollers 54 in each respective pair are horizontally spaced apart from each other for engaging the opposite sides of vertical posts 26. In order to facilitate the guiding of rollers 54, posts 26 may be generally rectangular in horizontal cross section. In this manner, carriage 40 is guided for substantially vertical movement relative to base frame 20. Carriage 40 may be further guided for vertical movement by any suitable means such as nylon buttons 56 mounted in enlarged portion 52 of the side plates and located to slidably engage the outer sides of vertical posts 26.

A length of hollow tubing 58 is secured between side plates 42 to serve as a mounting for a cantilevered support shaft 60 which projects horizontally and forwardly from carriage 40. A pair of ball bearing supports 62 are mounted upon shaft 60 at spaced locations with the outer race of each bearing 62 received in one end of a freely rotatable spindle 64. The outer end 66 of spindle 64 is externally threaded and a wheel mounting cone 68 is fixedly mounted on the nonthreaded inner portion in concentric surrounding relation. A series of circumferentially extending mounting grooves as at 70, 72 and 74 are formed on the external surface of cone 68 for purposes which will be explained in greater detail below.

A suitable elevating mechanism 78 such as hydraulic cylinder 80 is mounted between posts 26. Cylinder 80 may be supplied with fluid under pressure from any suitable source, such as an air over oil accumulator or reservoir 88 to which it is connected by conduit 86. As those skilled in the art will appreciate, reservoir 88 is partially filled with a hydraulic fluid such as oil, and actuation of motor 78 in a raising direction is accomplished by supplying air under pressure to the head space of reservoir 88 and in a lowering direction by venting head space of reservoir 88. Because the balancer will almost invariably be employed where air under pressure for tire inflation is available, a conventional tire inflation valve 90 may be mounted at the top of accumulator 88 and when it is desired to elevate carriage 40, air under pressure is supplied to the head space of accumulator 88 by simply connecting a tire inflation air hose 92 to valve 90 to increase the pressure in the head space of accumulator 88. This pressure displaces oil from the reservoir into the head end of motor 78 to cause its piston rod 84 to extend. To lower carriage 40, a manually operable vent valve 94 communicating with the head space of accumulator 88 is opened to bleed air from the accumulator until carriage 40 is lowered to the desired position.

In FIG. 1, the balancer is shown with a tire and disc type wheel designated generally W mounted upon the balancer. The wheel is mounted upon an appropriate groove on cone 68, in this particular instance the wheel size being such that the wheel W is seated in groove 72. It will be appreciated that each of the grooves such as 70, 72, 74 corresponds to the central diameter each of a plurality of truck wheel discs. If a wheel is to be balanced having a different diameter than that shown in FIG. 1, the wheel will be seated on a different one of the grooves. The wheel disc D is held in position on cone 68 by a disc clamping assembly having a hub 110 slidably received upon shaft 64 and a clamping ring 112 is fixedly mounted upon the hub by means of a plurality of spokes 114. A spinner nut 116 threadably received on threads 66 of spindle 64 is employed to axially clamp ring 112 against the wheel disc to firmly maintain the disc seated in notch 72 of support cone 68. Nut 116 is preferably provided with a pair of outwardly projecting handles 118.

The apparatus described above is capable of handling truck tires within the size range of tires from 15 inch diameter low boy truck tires to 14.00–24 when mounted upon wheels such as W having a rim R with or without a central wheel disc D of standard sizes for tires within this range. Wheels within this size range with a tire mounted upon them are quite heavy, the weight of a standard size rim or disc wheel and tire for the maximum tire size referred to above being about 300 pounds. The present invention is especially designed to minimize the manual labor involved in the mounting upon and removal of the wheel and tire from the balancer.

To mount a rim and disc type wheel upon the balancer spindle 64 is first positioned at an elevation above the floor approximately equal to the radius of the wheel to be mounted. The wheel is then rolled into position with its weight resting on the floor with spindle 64 and at least a portion of cone 68 projecting through the central opening in the wheel disc D. At this point, further adjustment of the elevation of spindle 64 is made, by supplying air under pressure to accumulator 88 to elevate the spindle or by bleeding fluid from cylinder 80 by intermittent opening and closing of valve 94 until the disc is positioned in the proper cone groove. Spinner nut 116 is then threaded onto spindle 64 and tightened. The location of grooves 70, 72, 74 and the various unnumbered grooves on cone 68 correspond to standard diameters of the central hole in wheel discs D and as nut 116 is tightened the accuracy of coaxial alignment between wheel disc D and spindle 64 becomes apparent. Further adjustment of the elevation of spindle 64 may be required, however, if the spindle axis is only slightly higher than the wheel axis, the conical surface of mounting cone 68 will cam the wheel upwardly into true coaxial alignment and seated engagement with the appropriate circumferential seat in the cone.

When the wheel disc is firmly seated in the appropriate groove on cone 68, air under pressure is supplied from hose 92 via valve 90 to accumulator 88 to elevate carriage 40 and the supported wheel clear of contact with the floor and the balancing operation is performed in the conventional manner.

After the wheel has been balanced, valve 94 is opened to vent accumulator 88 to lower the wheel until it is again supported by the floor and the wheel is then removed from the spindle.

While most present day truck tires are mounted upon disc type wheels of the type shown in FIG. 1, some trucks are equipped with wheels having rims R which do not have a permanently attached disc. To enable the balancer according to the invention to handle the rim only type wheels, an adapter assembly shown in FIGS. 5–7 of drawings is employed. The adapter assembly may include three dogleg-shaped cam levers 120 which are pivotally secured at one end, as at 122 (FIG. 5), to brackets 124 symmetrically spaced 120° apart from each other upon a hollow sleeve 126. For clarity, only one of levers 120 is shown in FIG. 5. Levers 124 are preferably formed from two lengths of hollow steel tubing of square cross section having bevelled ends welded together to form the dogleg-shaped configuration of lever 120 best shown in FIG. 5. At the knee of dogleg lever 120, a roller 128 is rotatably mounted in any suitable manner, such as by a pin 130. Cone 68 may be formed with three symmetrically disposed roller receiving guide grooves 132, although said grooves are not essential.

In FIG. 5, the adapter assembly is shown with cam lever 120 at its minimum diameter position. Upon threading of clamp nut 116 inwardly along spindle 64, sleeve 126 is pushed to the left as viewed in FIG. 5, thus driving roller 130 of the illustrated lever 120 upwardly along its associated guiding groove 132. This action drives the cam lever toward the broken line position of FIG. 5, the outer or left hand end of lever 120 moving radially outwardly from the spindle axis as roller 120 is driven toward the maximum diameter end of cone 68. Because all three levers are commonly linked to sleeve 126, the outer ends of the three levers 120 are radially expanded or contracted simultaneously in accordance with the axial position of sleeve 126 relative to spindle 64.

To provide a precise adjustment of the outer ends of the three levers 120 relative to each other, a fine radius adjustment is provided at the outer end of each lever 120. This adjustment, as best seen in the cross sectional view of FIG. 7, includes a nut 134 welded into the hollow outer end of each lever 120 and a threaded stud 136 threaded into each nut 134. Cap nut 138 having a spherical upper surface is then threaded onto the projecting end of stud 136. The spherical surface of nut 138 provides a uniform bearing surface against the inner surface of the tire rim R, regardless of the angle of engagement, and by threading nut 138 upon stud 136, a fine adjustment may be made which assures that all three of the tire engaging ends of levers 120 are positioned equidistant from the axis of spindle 64.

A discless tire to be mounted upon the apparatus is positioned with rim R in surrounding relationship to cone 68 and nut 116 is then screwed inwardly on spindle 64 until the outer ends of cam levers 120 engage the rim to clamp the tire firmly in coaxial relationship to the axis of spindle 64. The wheel is then raised and balanced in the manner indicated above.

While one embodiment of the invention has been described in detail, it will be apparent to those skilled in the art that the described embodiment of the invention may be modified. Therefore, the foregoing description is to be considered exemplary rather than limiting and the true scope of the invention is that defined in the following claims.

I claim:

1. Apparatus for balancing wheels of sizes falling within a range of standard sizes comprising:
    frame means having a generally vertically extending portion,
    carriage means mounted on said frame means for vertical movement on said generally vertically extending portion,
    wheel support means mounted on said carriage means for rotation solely about a substantially horizontal axis and including wheel mounting means for supporting wheels of sizes falling within said predetermined range of standard sizes, said wheel mounting means being constructed and arranged to support said wheels for rotation with its axis substantially coaxial with said substantially horizontal axis,
    motor means engaging said carriage means and constructed and arranged for elevating said carriage means substantially vertically on said vertically extending portion,
    said motor means having sufficient elevating capacity for raising said wheel support means and a wheel mounted thereon from a position of rest on a support surface and for supporting the same at said elevated position,
    and clamping means constructed and arranged for being releasably mounted on said wheel support means and having a wheel engaging portion for detachably securing a wheel on said wheel mounting means,
    said motor means being operative to lower said spindle until the wheel mounted thereon engages said support surface following the completion of a balancing operation.

2. The apparatus set forth in claim 1 wherein said generally vertically extending portion includes a generally vertical guide means, said carriage means including engaging means movably mounted on said guide means for guiding said carriage means vertically.

3. The apparatus set forth in claim 2 wherein said means includes wheel support spindle means rotatably mounted on said carriage means, said spindle means having a threaded portion disposed outwardly of said wheel mounting means, said clamping means including a clamp nut turnably mounted on said threaded portion for engaging one side of a wheel for clamping the other side thereof on said wheel mounting means.

4. The apparatus set forth in claim 3 wherein the wheel to be mounted includes a disc having a central opening, said clamping means further including means engageable with said disc to force said wheel axially toward said wheel mounting means and into seating engagement therewith.

5. The apparatus set forth in claim 4 wherein said wheel mounting means has a generally conical surface coaxial with said horizontal axis with the large diameter end thereof facing said carriage means.

6. The apparatus set forth in claim 5 wherein said wheel mounting means includes a plurality of annular surface means formed on said generally conical surface means and concentrically arranged relative to said horizontal axis, each of said annular surface means having a diameter substantially coincident with the internal diameter of a different sized wheel rim.

7. The apparatus set forth in claim 6 wherein the wheel to be mounted includes a disc having a central opening, said clamp nut further including means engageable with said disc to force said wheel axially toward said wheel mounting means and into seating engagement therewith.

8. The apparatus set forth in claim 7 wherein said vertically extending guide means comprising spaced apart rail means, said carriage means including pairs of spaced apart rollers, each of the rollers of said pairs engaging an opposite side of said rail means.

9. The apparatus set forth in claim 8 wherein said motor means comprises fluid operated cylinder means having a movable portion engageable with said carriage means.

10. The apparatus as defined in claim 1 wherein the vehicle wheel is of the type having a disc with a central opening of a standard diameter dependent upon the wheel size, said wheel mounting means including a frusto-conical mounting member fixedly and coaxially mounted upon said wheel support means, said conical member having a maximum diameter greater than the largest wheel central opening diameter and a minimum diameter less than the minimum wheel central opening diameter, a plurality of circumferentially extending grooves in said conical member at diameters of said conical member corresponding respectively to the standard central opening diameters of wheels to be mounted thereon, a cylindrical clamping ring slidably and detachably mounted upon said spindle and adapted to axially engage the disc of a wheel mounted on said conical member, said clamp means urging said clamping ring axially toward the large diameter end of said conical member.

11. The apparatus set forth in claim 1 wherein the wheel to be mounted includes an annular rim having an inner surface, said wheel mounting means including a plurality of extensible means extending adjustably outwardly from said wheel mounting means for engaging the interior surface of said rim said clamping means being operative to engage said extensible means and for moving the same into and out of clamping engagement with said inner surface.

12. The apparatus set forth in claim 11 wherein said wheel mounting means has a generally conical surface coaxial with said horizontal axis with the large diameter end thereof facing said carriage means, said plurality of means being slidable outwardly on said conical surface, said clamping means mounted on said wheel mounting means for adjustably engaging said plurality of extensible means for moving the same on said surface for and into and out of engagement with said rim surface.

13. The apparatus as defined in claim 12 wherein said plurality of extensible means includes cam means slidably engaged with the conical surface of said wheel mounting means to be expanded radially outwardly into engagement with the wheel rim upon movement of said clamping means toward said frusto-conical member.

14. Apparatus as defined in claim 13 wherein a plurality of guide grooves are formed on said conical surface, sleeve means slidably mounted on said spindle means for movement toward and away from the small diameter end of said mounting means, said plurality of cam means each pivotally mounted at one end on said sleeve and having an intermediate portion slidably received in one of said guide grooves, means on the opposite end of each of said cam means engageable with the inner rim surface and clamp means being adjustably mounted on said spindle for forcing said sleeve toward said frusto-conical member to thereby cam said opposite ends of said levers radially outwardly of said second means.

15. The apparatus set forth in claim 14 wherein said generally vertically extending portion includes a generally vertical guide means, said carriage means including engaging means movably mounted on said guide means for guiding said carriage means vertically.

16. The apparatus set forth in claim 15 wherein said motor means comprises fluid operated cylinder means having a movable portion engageable with said carriage means.

17. The apparatus set forth in claim 16 wherein said vertically extending guide means comprising spaced apart rail means, said carriage means including pairs of spaced apart rollers, each of the rollers of said pairs engaging an opposite side of said rail means.

18. The method of balancing a tire and wheel wherein said wheel has a central opening formed therein, the steps of elevating a horizontally rotatable spindle above a support surface to a position which is lower than the uppermost point of said central opening when said wheel is positioned vertically on said support surface, moving said wheel opening over said spindle, further elevating said spindle to elevate said tire and wheel above said support surface, clamping said wheel to the surface of said spindle, balancing said wheel, lowering said spindle until said tire engages said support surface and unclamping said wheel.

* * * * *

UNITED STATES PATENT OFFICE
CERTIFICATE OF CORRECTION

Patent No. 3,824,862                   Dated July 23, 1974

Inventor(s)   Charles Earl Branick

It is certified that error appears in the above-identified patent and that said Letters Patent are hereby corrected as shown below:

Claim 1, line 36, delete "its axis" and substitute --their axes--; lines 53-54, delete "spindle" and substitute --wheel support means--

Claim 3, line 62, after "said" insert --wheel support--

Claim 5, line 11, after "said" insert --substantially--

Claim 6, line 16, delete "means" at beginning of line
line 16, after "said" insert --substantially--

Claim 7, lines 20, 21, 22, delete "the wheel to be mounted includes a disc having a central opening"

Claim 8, line 27, delete "vertically extending" and substitute --generally vertical--

Claim 10, line 36, delete "vehicle wheel is" and substitute --wheels to be balanced are--
line 52, change "clamp" to --clamping--

Claim 11, line 56, delete "mounted" and substitute --balanced--

Claim 12, line 67, after "of" at end of line insert --extensible--
line 3, insert --conical-- after "said"

Signed and sealed this 3rd day of December 1974.

(SEAL)
Attest:

McCOY M. GIBSON JR.
Attesting Officer

C. MARSHALL DANN
Commissioner of Patents